United States Patent  
Li

(10) Patent No.: US 11,635,788 B2
(45) Date of Patent: Apr. 25, 2023

(54) MOBILE TERMINAL AND HOST DEVICE THEREOF

(71) Applicant: GUANGDONG OPPO MOBILE TELECOMMUNICATIONS CORP., LTD., Guangdong (CN)

(72) Inventor: Jie Li, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 17/193,423

(22) Filed: Mar. 5, 2021

(65) Prior Publication Data

US 2021/0191469 A1  Jun. 24, 2021

Related U.S. Application Data

(63) Continuation of application No. PCT/CN2019/095898, filed on Jul. 12, 2019.

(30) Foreign Application Priority Data

Sep. 6, 2018  (CN) .......................... 201821457543.6

(51) Int. Cl.
*H04M 1/02* (2006.01)
*G06F 1/16* (2006.01)

(52) U.S. Cl.
CPC .......... *G06F 1/1654* (2013.01); *G06F 1/1632* (2013.01); *G06F 1/1681* (2013.01); *H04M 1/0216* (2013.01)

(58) Field of Classification Search
CPC .... G06F 1/1654; G06F 1/1632; G06F 1/1681; G06F 1/1683; F16M 11/041;

(Continued)

(56) References Cited

U.S. PATENT DOCUMENTS 6,940,713 B2* 9/2005 Huang ................. G06F 1/1632
345/905
6,986,492 B2* 1/2006 Huang ................. G06F 1/1632
248/346.03

(Continued)

FOREIGN PATENT DOCUMENTS

CN  203340480 U  12/2013
CN  104199560 A  12/2014

(Continued)

OTHER PUBLICATIONS

Extended European Search Report for EP Application 19856940.2 dated Sep. 29, 2021. (7 pages).

(Continued)

*Primary Examiner* — Adrian S Wilson
*Assistant Examiner* — Gage Crum
(74) *Attorney, Agent, or Firm* — Young Basile Hanlon & MacFarlane, P.C.

(57) ABSTRACT

A mobile terminal and a host device thereof, the mobile terminal comprising a display device and a host device, the host device including a body and a support assembly, and the body defining an accommodating groove; wherein the support assembly includes a first support piece and second support piece are rotatably connected to the body, and the support assembly has a folded state and an unfolded state; when the support assembly is in the folded state, the first support piece and the second support piece are accommodated within the accommodating groove; when the support assembly in the unfolded state, the first support piece and the second support piece are rotated out of the accommodating groove; the first support piece and the second support piece define a clamping groove, and when the display device is clamped in the clamping groove, the display device stands vertically or slantwise on the body.

19 Claims, 11 Drawing Sheets

(58) Field of Classification Search
CPC .. F16M 11/10; H04M 1/0254; H04M 1/0206; H04M 1/0216
USPC .................................................. 361/679.29
See application file for complete search history.

(56) References Cited

U.S. PATENT DOCUMENTS

| | | | | |
|---|---|---|---|---|
| 9,244,535 B2* | 1/2016 | Bates | ................... | G06F 1/1656 |
| 9,342,111 B2* | 5/2016 | Kao | ................... | G06F 1/1679 |
| 9,348,363 B2* | 5/2016 | Hui | ................... | G06F 1/1626 |
| 10,001,814 B2* | 6/2018 | Lee | ................... | G06F 1/1626 |
| 11,134,580 B2* | 9/2021 | Gengler | ................ | G06F 1/1626 |
| 2002/0105502 A1* | 8/2002 | Tsai | ..................... | G06F 1/1626 |
| | | | | 345/169 |
| 2004/0212954 A1* | 10/2004 | Ulla | ..................... | G06F 1/1632 |
| | | | | 361/679.09 |
| 2004/0232302 A1 | 11/2004 | Huang et al. | | |
| 2005/0073808 A1* | 4/2005 | Wang | ................... | G06F 1/1632 |
| | | | | 361/679.57 |
| 2008/0024975 A1* | 1/2008 | Huang | ................. | G06F 1/1679 |
| | | | | 361/679.44 |
| 2011/0292584 A1* | 12/2011 | Hung | .................... | G06F 1/1632 |
| | | | | 361/679.26 |
| 2013/0029672 A1* | 1/2013 | Rofougaran | ........ | H04W 40/246 |
| | | | | 455/445 |
| 2013/0170126 A1 | 7/2013 | Lee | | |
| 2014/0029185 A1* | 1/2014 | Leong | ................... | G06F 1/1669 |
| | | | | 361/679.08 |
| 2014/0111923 A1 | 4/2014 | Hu et al. | | |
| 2014/0355210 A1 | 12/2014 | Hashimoto et al. | | |
| 2014/0362504 A1* | 12/2014 | Liang | ..................... | A45C 11/00 |
| | | | | 361/679.3 |
| 2015/0049423 A1 | 2/2015 | Hsu et al. | | |
| 2016/0048173 A1* | 2/2016 | Lyles | ................... | G06F 1/1632 |
| | | | | 361/679.17 |
| 2018/0181167 A1 | 6/2018 | Lam et al. | | |

FOREIGN PATENT DOCUMENTS

| | | |
|---|---|---|
| CN | 204578610 U | 8/2015 |
| CN | 204578611 U | 8/2015 |
| CN | 204615899 U | 9/2015 |
| CN | 105094221 A | 11/2015 |
| CN | 105516410 A | 4/2016 |
| CN | 106125843 A | 11/2016 |
| CN | 107770316 A | 3/2018 |
| CN | 108156309 A | 6/2018 |

OTHER PUBLICATIONS

International Search Report with English Translation for PCT/CN2019/095898, dated Sep. 17, 2019 (14 pages).
Chinese First office action with English Translation for Chinese application No. 201980049096.1 dated May 27, 2022 (26 pages).
Communication pursuant to Article 94(3) EPC for EP Application 19856940.2 dated Dec. 23, 2022. (5 pages).
Chinese Second Office Action with English Translation for CN Application 201980049096.1 dated Dec. 5, 2022. (28 pages).

* cited by examiner

MOBILE TERMINAL AND HOST DEVICE THEREOF

CROSS-REFERENCE TO RELATED APPLICATION(S)

The present application is a continuation-application of International (PCT) Patent Application No. PCT/CN2019/095898 filed Jul. 12, 2019, which claims priority of Chinese Patent Application No. 201821457543.6, filed on Sep. 6, 2018, the entire contents of both of which are hereby incorporated by reference.

TECHNICAL FIELD

The present disclosure relates to the field of terminal technologies, and in particular, to a mobile terminal and a host device thereof.

BACKGROUND

At present, display assemblies and host assemblies of mobile terminals such as smart phones and tablet computers are integrated, which not only limits a lightweight design of mobile terminals, but also limits usage scenarios of the mobile terminals.

SUMMARY

Based on the background above, it is necessary to provide a mobile terminal and a host device thereof.

A host device is configured to support a display device. The display device includes a front surface, a back surface, and a side peripheral surface. The back surface is arranged opposite to the front surface. The side peripheral surface is connected between the front surface and the back surface. The display device includes a display screen. A display region of the display screen faces one side of the display device at which the front surface is located. The host device includes a body and a support assembly. The display device is capable of being mounted on the body. The display device is detachable from the body, the body is configured to communicate with the display device. The body defines an accommodating groove. The support assembly includes a first support piece and a second support piece. The first support piece is rotatable around a first rotation axis relative to the body. The second support piece is rotatable around a second rotation axis relative to the body. The support assembly has a folded state and an unfolded state. When the support assembly is in the folded state, the first support piece and the second support piece are both accommodated within the accommodating groove. When the support assembly is in the unfolded state, the first support piece and the second support piece are rotated out of the accommodating groove and vertically or slantwise stand on the body. The first support piece and the second support piece define a clamping groove. When the display device is clamped in the clamping groove, the first support piece contacts the front surface, the second support piece contacts the back surface, and the display device stands vertically or slantwise on the body.

A mobile terminal includes a display device and a host device. The display device includes a front surface, a back surface arranged opposite to the front surface, a side peripheral surface connected between the front surface and the back surface, and a display screen having a display region facing one side of the display device at which the front surface is located. The host device includes a body and a support assembly. The display device is capable of being mounted on the body. The display device is detachable from the body. The display device is configured to communicate with the body, and the body defines an accommodating groove. The support assembly includes a first support piece and a second support piece. The first support piece is rotatable around a first rotation axis relative to the body. The second support piece is rotatable around a second rotation axis relative to the body. The support assembly has a folded state and an unfolded state. When the support assembly is in the folded state, the first support piece and the second support piece are both accommodated within the accommodating groove. When the support assembly is in the unfolded state, the first support piece and the second support piece are rotated out of the accommodating groove and vertically or slantwise stand on the body. The first support piece and the second support piece define a clamping groove. When the display device is clamped in the clamping groove, the first support piece contacts the front surface, the second support piece contacts the back surface, and the display device stands vertically or slantwise on the body.

A mobile terminal including a display device and a host device. The display device includes a display surface, a non-display surface arranged opposite to the display surface. The host device includes a body and a support assembly. The body includes a first wireless communication module. The display device is capable of being mounted on the body. The display device is detachable from the body. The display device is configured to communicate with the body, and the body defines an accommodating groove. The support assembly includes a first support piece and a second support piece. The first support piece and the second support piece are both rotatably connected to the body. The support assembly has a folded state and an unfolded state. When the support assembly is in the folded state, the first support piece and the second support piece are both accommodated within the accommodating groove. When the support assembly is in the unfolded state, the first support piece and the second support piece are rotated out of the accommodating groove and vertically or slantwise stand on the body. The first support piece and the second support piece define a clamping groove. When the display device is clamped in the clamping groove, the first support piece contacts the display surface, the second support piece contacts the non-display surface, and the display device stands vertically or slantwise on the body.

BRIEF DESCRIPTION OF DRAWINGS

In order to make the technical solution described in the embodiments of the present disclosure more clearly, the drawings used for the description of the embodiments will be briefly described. Apparently, the drawings described below are only for illustration, but not for limitation. It should be understood that, one skilled in the art may acquire other drawings based on these drawings, without making any inventive work.

DETAILED DESCRIPTION

Figure 1:
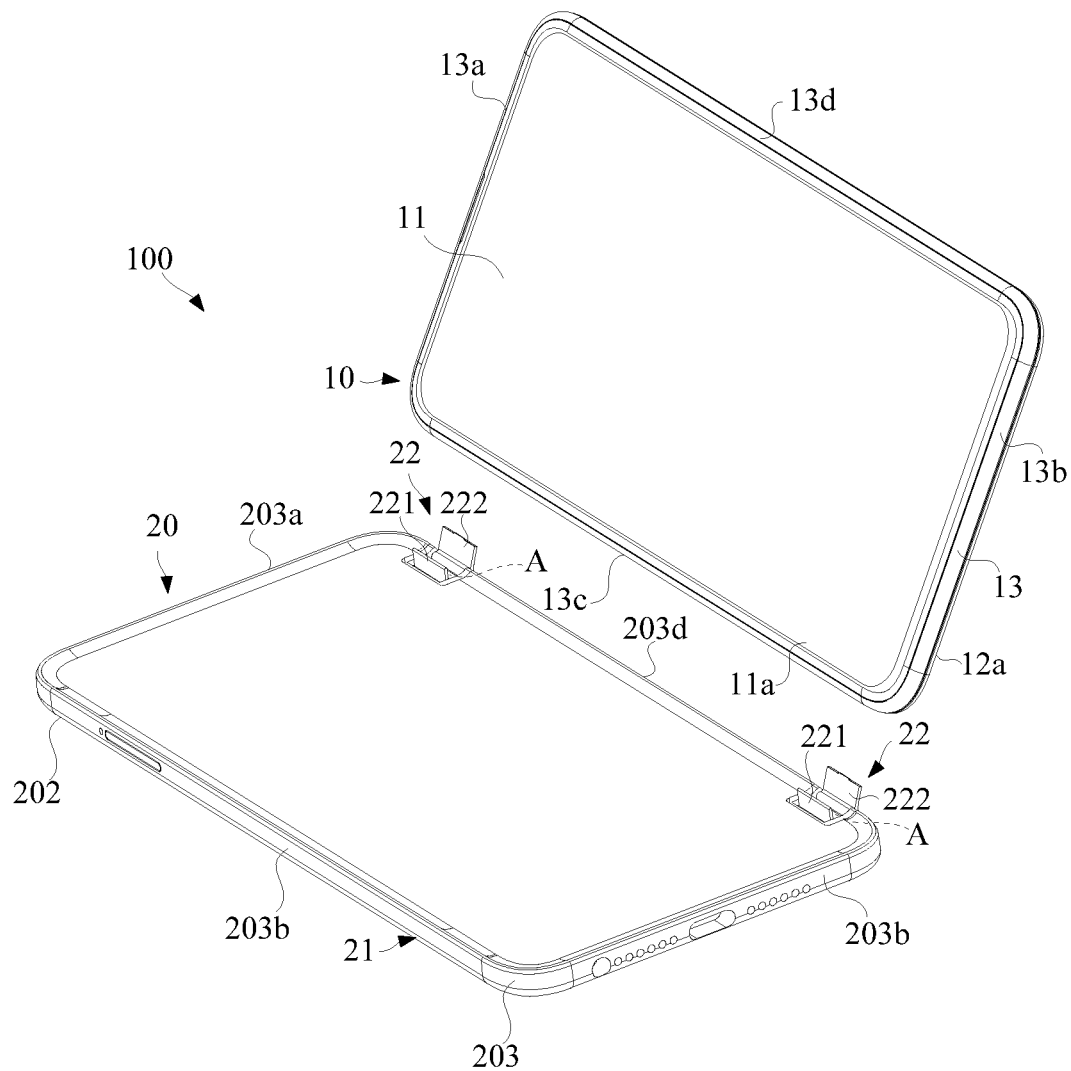
FIG. 1 is a schematic view of a display device and a host device of a mobile terminal in a disassembly state according to an embodiment.

In order to facilitate the understanding of the present disclosure, the present disclosure will be described more fully below with reference to the relevant drawings. The drawings show some embodiments of the present disclosure. However, the present disclosure can be implemented in many different forms and is not limited to the embodiments described herein. On the contrary, these embodiments are provided for a more thorough and comprehensive understanding of the disclosure of the present disclosure.

In the present disclosure, a terminal device used herein includes, but is not limited to, a device that is configured to receive/transmit communication signals via one or more of the following connection manners: (1) a wire line connection, such as via a public switched telephone network (PSTN), a digital subscriber line (DSL), a digital cable, a direct cable connection; (2) a wireless interface, for example, a cellular network, a wireless local area network (WLAN), a digital television network such as a DVB-H network, a satellite network, an AM-FM broadcast transmitter.

A terminal device that is set to communicate over a wireless interface may be referred to as a mobile terminal.

Examples of the mobile terminal include, but are not limited to the following electric device: (1) a satellite or a cellular radiotelephone; (2) a Personal Communications System (PCS) terminal that may combine a cellular radiotelephone with data processing, facsimile and data communications capabilities; (3) a PDA (Personal Digital Assistant) that can include a radiotelephone, pager, an Internet/intranet access, a Web browser, organizer, a calendar and/or a global positioning system (GPS) receiver; (4) a conventional laptop and/or a palmtop receiver; (5) a conventional laptop and/or a palmtop radiotelephone transceiver, or the like.

In some aspects, a host device is provided. The host device is configured to support a display device. The display device includes a front surface, a back surface, and a side peripheral surface. The back surface is arranged opposite to the front surface. The side peripheral surface is connected between the front surface and the back surface, the display device includes a display screen. A display region of the display screen faces one side of the display device at which the front surface is located. The host device includes a body and a support assembly. The display device is capable of being mounted on the body, and the display device is detachable from the body. The body is configured to communicate with the display device. The body defines an accommodating groove. The support assembly includes a first support piece and a second support piece. The first support piece is rotatable around a first rotation axis relative to the body. The second support piece is rotatable around a second rotation axis relative to the body. The support assembly has a folded state and an unfolded state. When the support assembly is in the folded state, the first support piece and the second support piece are both accommodated within the accommodating groove. When the support assembly is in the unfolded state, the first support piece and the second support piece are rotated out of the accommodating groove and vertically or slantwise stand on the body. The first support piece and the second support piece define a clamping groove. When the display device is clamped in the clamping groove, the first support piece contacts the front surface, the second support piece contacts the back surface, and the display device stands vertically or slantwise on the body.

In some embodiments, a bottom wall of the accommodating groove includes an abutting surface. The second support piece includes a support piece body and an eccentric block connected to the support piece body. The second rotation axis runs through the eccentric block. The eccentric block is provided with an abutting bump. The abutting bump is disposed at one side of the eccentric block away from the first support piece when the support assembly is in the folded state. When the support assembly is in the unfolded state, the abutting bump contacts with the abutting surface, and the second support piece stands vertically or slantwise on the body.

In some embodiments, the host device includes a front end face, a rear end face, and a side end face. The front end face is arranged opposite to the rear end face. The side end face is connected between the front end face and the rear end face. The accommodating groove runs through the front end face and the side end face.

In some embodiments, the body defines a side slot fluidly connected to the accommodating groove. The second support piece is provided with a boss. When the support assembly is in the folded state, the second support piece is stacked on the first support piece, and the boss is configured to cooperate with the side slot and restrict rotation of the second support piece relative to the body. An elastic member is arranged between the first support piece and the body. After the boss is detached from the side slot, the elastic member is configured to drive the first support piece to rotate around the first rotation axis relative to the body. The first support piece is capable of rotating the second support piece out of the accommodating groove.

In some embodiments, the body includes a support. The support includes a connecting wall and a pair of side walls. The pair of side walls are arranged opposite to each other and connected to two opposite ends of the connecting wall to cooperatively define the accommodating groove. The first support piece is rotatably connected to the pair of side walls. The second support piece is rotatably connected to the pair of side walls.

In some embodiments, the elastic member includes a torsion spring. One end of the torsion spring is connected to the first support piece. The other end of the torsion spring is connected to the support.

In some embodiments, the first support piece includes a first shaft. Each of the pair of side walls defines a first shaft hole. A holding slot fluidly connected to the first shaft hole. The first shaft is rotatably inserted in the first shaft hole. The torsion spring is held in the holding slot. One end of the torsion spring is connected to the first shaft hole.

In some embodiments, the second support piece includes a second rotating shaft. Each of the pair of side walls defines a second shaft hole. The second rotating shaft is rotatably inserted in the second shaft hole. A cross section of the second shaft hole is substantially oval or racetrack shaped. The second rotating shaft is movable in the second shaft hole, and the boss is inserted into the side slot or moved out of the side slot along with the movement of the second rotating shaft in the second shaft hole.

In some embodiments, a surface of the second support piece away from the rear end face is substantially flush with the front end face when the support assembly is in the folded state.

In some embodiments, a first magnetic component is disposed on the body. A second magnetic component is disposed on the display device. When the display device is stacked on the front end from a side at which the back surface is located or a side at which the front surface is located, the first magnetic component is configured to absorb the second magnetic component to connect the display device to the body.

In some aspects, a mobile terminal is provided. The mobile terminal includes a display device and a host device. The display device includes a front surface, a back surface arranged opposite to the front surface, a side peripheral surface connected between the front surface and the back surface, and a display screen. The display screen has a display region facing one side of the display device at which the front surface is located. The host device includes a body and a support assembly. The display device is capable of being mounted on the body. The display device is detachable from the body. The display device is configured to communicate with the body. The body defines an accommodating groove. The support assembly includes a first support piece and a second support piece. The first support piece is rotatable around a first rotation axis relative to the body. The second support piece is rotatable around a second rotation axis relative to the body. The support assembly has a folded state and an unfolded state. When the support assembly is in the folded state, the first support piece and the second support piece are both accommodated within the accommodating groove. When the support assembly is in the unfolded state, the first support piece and the second support piece are rotated out of the accommodating groove and vertically or slantwise stand on the body. The first support piece and the second support piece define a clamping groove; when the display device is clamped in the clamping groove. The first support piece contacts the front surface. The second support piece contacts the back surface, and the display device stands vertically or slantwise on the body.

In some embodiments, a bottom wall of the accommodating groove includes an abutting surface. The second support piece includes a support piece body and an eccentric block connected to the support piece body. The second rotation axis runs through the eccentric block. The eccentric block is provided with an abutting bump. The abutting bump is disposed at one side of the eccentric block away from the first support piece when the support assembly is in the folded state. When the support assembly is in the unfolded state, the abutting bump contacts with the abutting surface, and the second support piece stands vertically or slantwise on the body.

In some embodiments, the host device includes a front end face, a rear end face, and a side end face. The front end face is arranged opposite to the rear end face. The side end face is connected between the front end face and the rear end face. The accommodating groove runs through the front end face and the side end face.

In some embodiments, the body defines a side slot fluidly connected to the accommodating groove. The second support piece is provided with a boss. When the support assembly is in the folded state, the second support piece is stacked on the first support piece, and the boss is configured to cooperate with the side slot and restrict rotation of the second support piece relative to the body. An elastic member is arranged between the first support piece and the body. After the boss is detached from the side slot, the elastic member is configured to drive the first support piece to rotate around the first rotation axis relative to the body, and the first support piece is capable of rotating the second support piece out of the accommodating groove.

In some embodiments, the body includes a support. The support includes a connecting wall and a pair of side walls. The pair of side walls are arranged opposite to each other and connected to two opposite ends of the connecting wall to cooperatively define the accommodating groove. The first support piece is rotatably connected to the pair of side walls. The second support piece is rotatably connected to the pair of side walls.

In some embodiments, the second support piece includes a second rotating shaft. Each of the pair of side walls defines a second shaft hole. The second rotating shaft is rotatably inserted in the second shaft hole. A cross section of the second shaft hole is substantially oval or racetrack shaped. The second rotating shaft is movable in the second shaft hole, and the boss is inserted into the side slot or moved out of the side slot along with the movement of the second rotating shaft in the second shaft hole.

In some aspects, a mobile terminal is provided. The mobile terminal includes a display device and a host device. The display device includes a display surface and a non-display surface arranged opposite to the display surface. The host device includes a body and a support assembly. The display device is capable of being mounted on the body. The display device is detachable from the body. The display device is configured to communicate with the body. The body defines an accommodating groove. The support assembly includes a first support piece and a second support piece. The first support piece and the second support piece are both rotatably connected to the body. The support assembly has a folded state and an unfolded state. When the support assembly is in the folded state, the first support piece and the second support piece are both accommodated within the accommodating groove. When the support assembly is in the unfolded state, the first support piece and the second support piece are rotated out of the accommodating groove and vertically or slantwise stand on the body. The first support piece and the second support piece define a clamping groove. When the display device is clamped in the clamping groove, the first support piece contacts the display surface, the second support piece contacts the non-display surface, and the display device stands vertically or slantwise on the body.

In some embodiments, a bottom wall of the accommodating groove includes an abutting surface. The second support piece includes a support piece body and an eccentric block connected to the support piece body. The second rotation axis runs through the eccentric block. The eccentric block is provided with an abutting bump. The abutting bump is disposed at one side of the eccentric block away from the first support piece when the support assembly is in the folded state. When the support assembly is in the unfolded state, the abutting burn contacts with the abutting surface, and the second support piece stands vertically or slantwise on the body.

In some embodiments, the body defines a side slot fluidly connected to the accommodating groove. The second support piece is provided with a boss. When the support assembly is in the folded state, the second support piece is stacked on the first support piece, and the boss is configured to cooperate with the side slot and restrict rotation of the second support piece relative to the body. An elastic member is arranged between the first support piece and the body. After the boss is detached from the side slot, the elastic member is configured to drive the first support piece to drive the second support piece to rotate out of the accommodating groove together to make the support assembly in the unfolded state.

In some embodiments, the display device includes a first controller, a microphone, a receiver, a first wireless transceiver module, an audio encoder, and an audio decoder. The host device includes a wireless modulation and demodulation module, a second controller, and a second wireless transceiver module configured to communicate with the first wireless transceiver module. The body includes a first wireless communication module, the display device includes a second wireless communication module communicating with the first wireless communication module. In a working state of the mobile terminal, audio signals from the microphone are encoded by the audio encoder and then transmitted to the first controller. Under control of the first controller, encoded audio signals are transmitted from the first wireless transceiver module to the second wireless transceiver module. Under control of the second controller, the encoded audio signals are transmitted to the wireless modulation and demodulation module, and sent to air after being modulated by the wireless modulation and demodulation module. The encoded audio signals from the air are demodulated by the wireless modulation and demodulation module and then transmitted to the second controller. Under the control of the second controller, the encoded audio signals are transmitted to the second wireless transceiver module, and sent to the display device after being modulated by the second wireless transceiver module. The first wireless transceiver module demodulates the encoded audio signals. Under the control of the first controller, the encoded audio signals are decoded by the audio decoder and output by the receiver.

Figure 2:
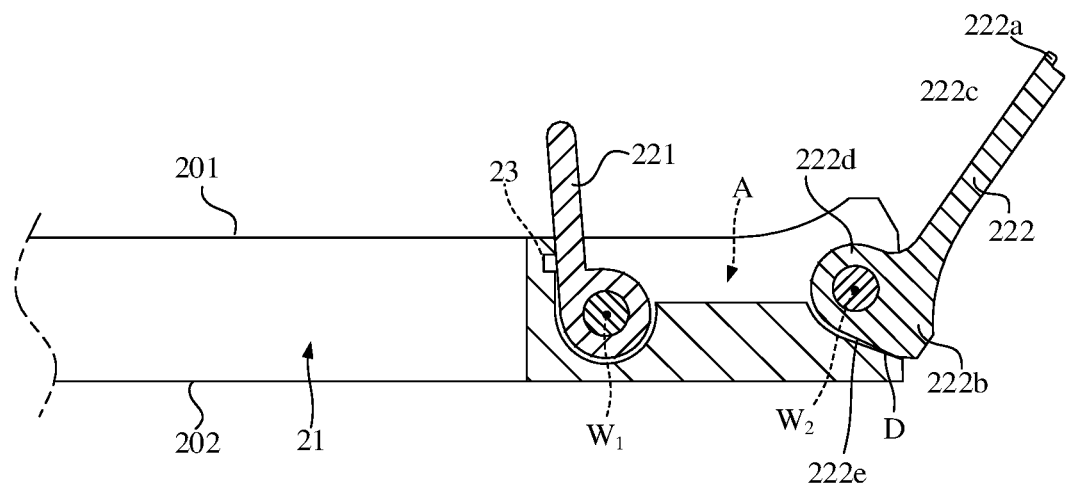
FIG. 2 is a cross-sectional view of a support assembly of the mobile terminal in an unfolded state shown in FIG. 1
Figure 3:
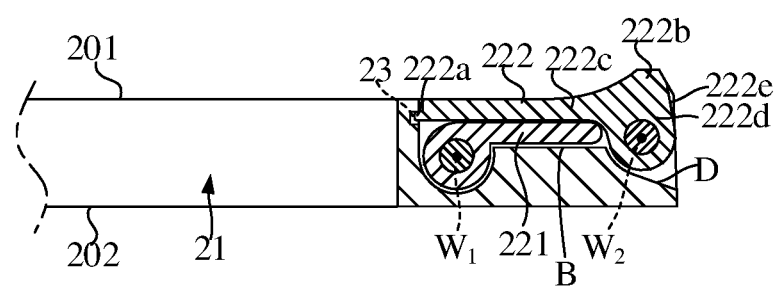
FIG. 3 is a cross-sectional view of the support assembly of the mobile terminal in a folded state shown in FIG. 2.
Figure 4:
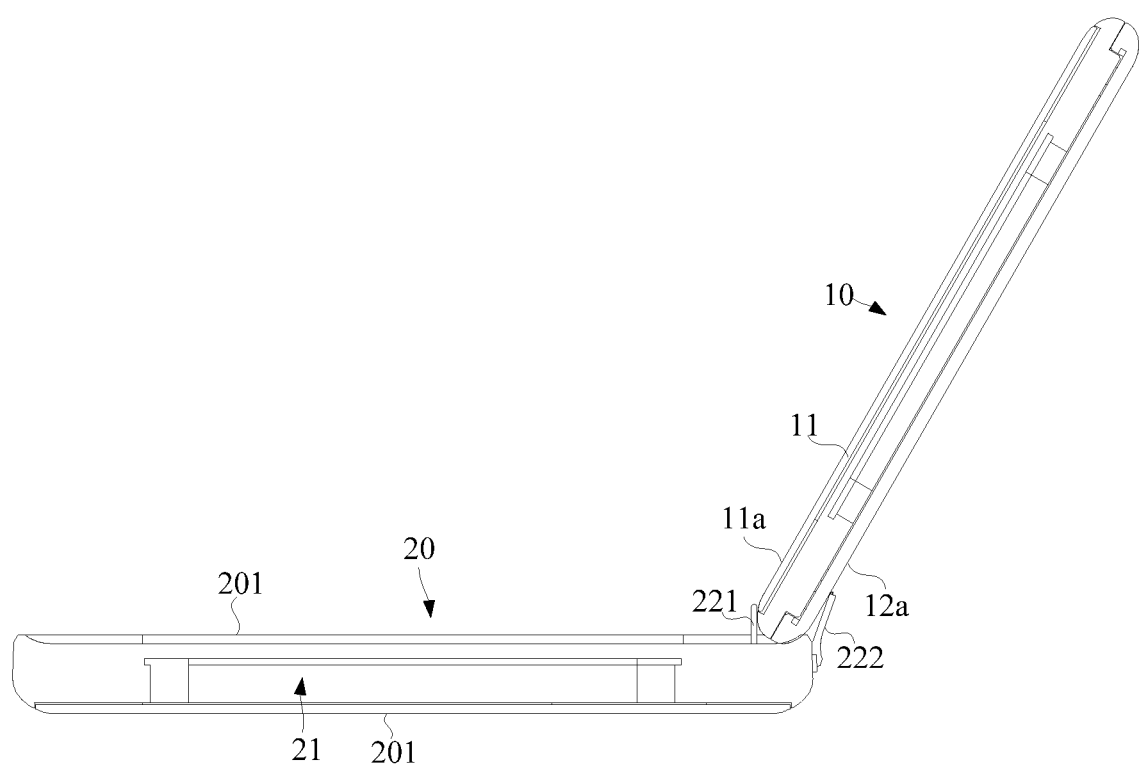
FIG. 4 is a schematic view of a support assembly of the mobile terminal clamping and positioning the display device shown in FIG. 1.
Figure 9:
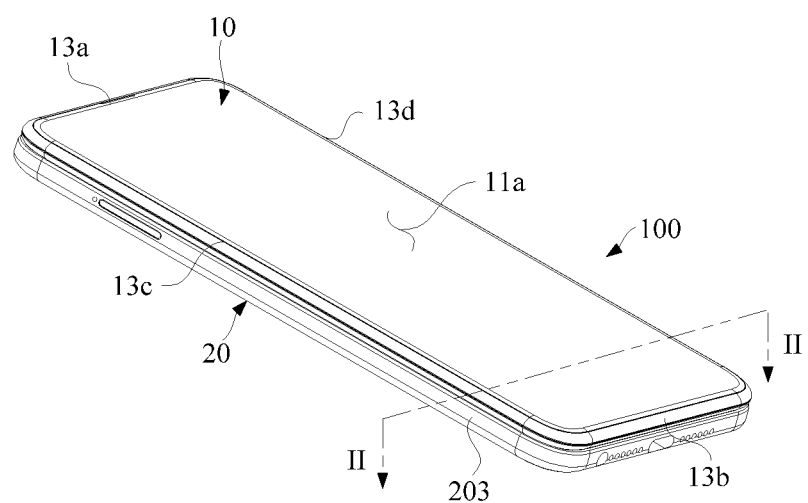
FIG. 9 is a schematic view of a display device of a mobile terminal stacked on a host device in an embodiment.
Figure 10:
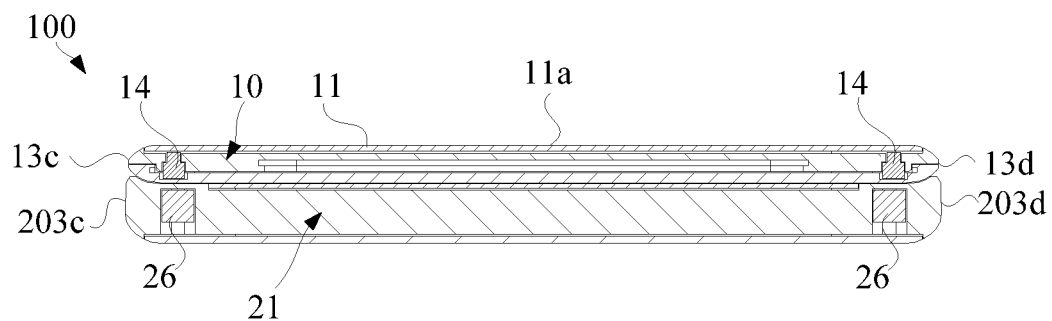
FIG. 10 is a cross-sectional view of the mobile terminal taken along line II-II in FIG. 9.

As shown in FIG. 1, in some embodiments, a mobile terminal 100 can be a smart phone or a tablet computer. The mobile terminal 100 includes a display device 10 and a host device 20. The display device 10 includes a front surface 11*a*, a back surface 12*a*, and a side peripheral surface 13. The back surface 12*a* is arranged opposite to the front surface 11*a*. The side peripheral surface 13 is connected between the front surface 11*a* and the back surface 12*a*. The display device 10 includes a display screen 11. A display region of the display screen 11 faces a side of the display device 10 at which the front surface 11*a* is located. The display screen 11 may display information and provide an interactive interface for users. As shown in FIG. 2 and FIG. 3, the host device 20 includes a body 21, a support assembly 22, and a first magnetic component 26. The body 21 includes a first wireless communication module, a first battery, and a main board. The first battery may supply power for the first wireless communication module and the main board. As shown in FIG. 9 together, the display device 10 may be installed on the body 2. The display device 10 is detachable from the body 21. The body 21 may be capable of communicating with the display device 10 through the first wireless communication module. As shown in FIG. 1 to FIG. 3, the body 21 defines an accommodating groove A. The support assembly 22 includes a first support piece 221 and a second support piece 222. The first support piece 221 is rotatable around a first rotation axis $W_1$ relative to the body 21. The second support piece 222 is rotatable around a second rotation axis $W_2$ relative to the body 21. The support assembly 22 includes a folded state and an unfolded state. As shown in FIG. 3, when the support assembly 22 is in the folded state, both the first support piece 221 and the second support piece 222 are accommodated within the accommodating groove A. Thus, the display device 10 may be stacked on the body 21 for use or carrying. In addition, since the support assembly 22 may be accommodated within the accommodating groove A without being abrupt, thus, overall aesthetic feeling of the host device 20 may be improved. As shown in FIG. 1, FIG. 2 and FIG. 10, when the support assembly 22 is in the unfolded state, the first support piece 221 and the second support piece 222 are rotated out of the accommodating groove A and vertically or slantwise stand on the body 21. The first support piece 221 and the second support piece 222 cooperatively define a clamping groove or an engaging groove. The clamping groove may be configured to clamp and position the display device 10. As shown in FIG. 4, when the display device 10 is clamped or engaged in the clamping groove, the first support piece 221 contacts the front surface 11*a*, and the second support piece 222 contacts the back surface 12*a*. Thus, the display device 10 vertically or slantwise stands on the body 21, thereby realizing a side standing display effect and facilitating viewing of content displayed in the display region of the display device 10.

In an embodiment, the display device 10 includes a second wireless communication module and a second battery. The second battery may supply power for the display screen 11 and the second wireless communication module. Understandably, the display device 10 may be capable of communicating with the first wireless communication module through the second wireless communication module to realize data and signal transmission with the host device 20. The first battery may be a nuclear battery, such as a tritium battery. The nuclear battery is small and light, and has a long service life, and may provide power for the host device 20, the first communication module, and other electronic components received in the host device 20 for a long time. In other embodiments, the first battery may also include a lithium battery or the like, and the first battery may be repeatedly charged and discharged. In an embodiment, the second battery may be a lithium battery which may be repeatedly charged and discharged for many times, or other types of batteries, which is not limited here.

The first wireless communication module and the second wireless communication module both adopt a short distance communication technology, and the first communication module and the second communication module adopt a same communication protocol. For example, the first wireless communication module and the second wireless communication module may both be Bluetooth communication modules, wireless fidelity (WiFi) communication modules, infrared data association (IrDA) modules, ZigBee communication modules, ultra wideband communication modules, near field communication (NFC) modules, or the like. Communication connection between the first wireless communication module and the second wireless communication module may realize data transmission between the display device 10 and the host device 20. Data transmitted from the host device 20 to the display device 10 may be further converted into display, touch, or other signals. Data transmitted from the display device 10 to the host device 20 may be stored or further processed. In other embodiments, the display device 10 may also include an audio output module for outputting sound, or an imaging device for imaging or photographing, etc., which will not be described here. The body 21 may also be provided with the audio output module or the like.

As shown in FIG. 1, FIG. 2 and FIG. 10, in some embodiments, the host device 20 includes a front end face 201, a rear end face 202, and a side end face 203. The front end face 201 is arranged opposite to the rear end face 202. The side end face 203 is connected between the front end face 201 and the rear end face 202. The accommodating groove A runs through the front end face 201 and the side end face 203. In one embodiment, the host device 20 is substantially a rectangular block. The side end face 203 includes a top end face 203a, a bottom end face 203b, a left end face 203c, and a right end face 203d. The top end face 203a and the bottom end face 203b are connected between the left end face 203c and the right end face 203d. The left end face 203c and the right end face 203d are connected between the top end face 203a and the bottom end face 203b.

In one embodiment, the number of support assemblies 22 may be multiple. Thus, the display screen 11 may be supported by multiple support assemblies 22 in the unfolded state, which may effectively improve a support force and ensure support stability. For example, as shown in FIG. 1, the host device 20 is provided with two support assemblies 22. The two support assemblies 22 are respectively arranged along an extension direction of the right end face 203d, so that in the unfolded state, the support assembly 22 may make the display device 10 stand on a side of the body 21 close to or adjacent to the right end face 203d. Understandably, more than two support assemblies 22 may be arranged along a circumference of the side end face 203 according to actual needs. Thus, the display device 10 may stand on different end faces of the body 21.

As shown in FIG. 2 and FIG. 3 together, in some embodiments, the body 21 defines a side slot 23 communicated with the accommodating groove A, and the second support piece 222 is provided with a boss 222a. As shown in FIG. 3, when the support assembly 22 is in the folded state, the second support piece 222 is stacked on the first support piece 221, and the boss 222a may cooperate with the side slot 23 to restrict rotation of the second support piece 222 relative to the body 21, such that the second support piece 222 is limited in the accommodating groove A. It can be understood that since the second support piece 222 is stacked on the first support piece 221, the first support piece 221 is also limited in the accommodating groove A in case that the second support piece 222 is limited in the accommodating groove A since the second support piece 222 cannot rotate relative to the body 21. Correspondingly, after the boss 222a is detached, removed or separated from the side slot 23, the second support piece 222 may rotate relative to the body 21 and be unfolded. Under these circumstances, in response to the first support piece 221 being forced to rotate relative to the body 21 and be unfolded, the first support piece 221 will drive the second support piece 222 to rotate out of the accommodating groove A. For example, in one embodiment, an elastic member may be disposed between the first support piece 221 and the body 21. After the boss 222a is detached from the side slot 23, the elastic member may drive the first support piece 221 to rotate around the first rotation axis $W_1$ relative to the body 21, so that the first support piece 221 will drive the second support piece 222 to rotate out of the accommodating groove A. In this way, when the support assembly 22 needs to be switched to the unfolded state, the first support piece 221 and the second support piece 222 may be rotated out of the accommodating groove A with help of an elastic restoring force of the elastic member only by moving the boss 222a of the second support piece 222 to cooperate with the side slot 23 (more specifically, the boss 222a is removed or detached from the side slot 23). Operation is simple. In some embodiments, as further shown in FIGS. 2-3, a rotation direction of the first support piece 221 may be different from or even opposite to a rotation direction of the second support piece 222. For example, as shown in FIG. 2, when the support assembly 22 needs to be switched to the unfolded state, the first support piece 221 is rotated anticlockwise about the first rotation axis W1, while the second support piece 222 is rotated clockwise about the second rotation axis W2. Furthermore, the first rotation axis W1 is offset from the second rotation axis W2.

As further shown in FIG. 2 and FIG. 3, in an embodiment, a bottom wall B of the accommodating groove A includes an abutting surface D. The second support piece 222 includes a support piece body 222c and an eccentric block 222d connected to the support piece body 222c. The eccentric block 222d is provided with an abutting bump 222b. The second rotation axis W2 may run through the eccentric block 222d. The abutting bump 222b may be disposed at one side of the eccentric block 222d in a direction away from the second rotation axis W2. In the folded state, the abutting bump 222b may be disposed at one side of the eccentric block 222d away from the first support piece 221 and away from the rear end face 202. A geometric center of the eccentric block 222d is not coincide with or is offset from a rotation center of the eccentric block 222d (herein, the rotation center of the eccentric block 22d is disposed in the second rotation axis W2). The geometric center of the eccentric block 222d is closer to a side of the abutting bump 222b than the rotation center of the eccentric block 222d. The abutting bump 222b may include a contacting surface 222e. In the unfolded state, the second support piece 222 may rotate about the second rotation axis W2, such that a part of the contacting surface 222e of the abutting bump 222b contacts with or even abuts against the abutting surface D, and the other part of the contacting surface 222e of the abutting bump 222b is located out of the accommodating groove A and beyond the abutting surface D since the geometric center of the eccentric block 222d is not coincide with or is offset from a rotation center of the eccentric block 222d. Thus, the second support piece 222 may be restricted from further rotating in an unfolded direction relative to the body 21. Thus, the second support piece 222 may be positioned and the second support piece 222 may vertically or slantwise stand on the body 21.

Figure 5:
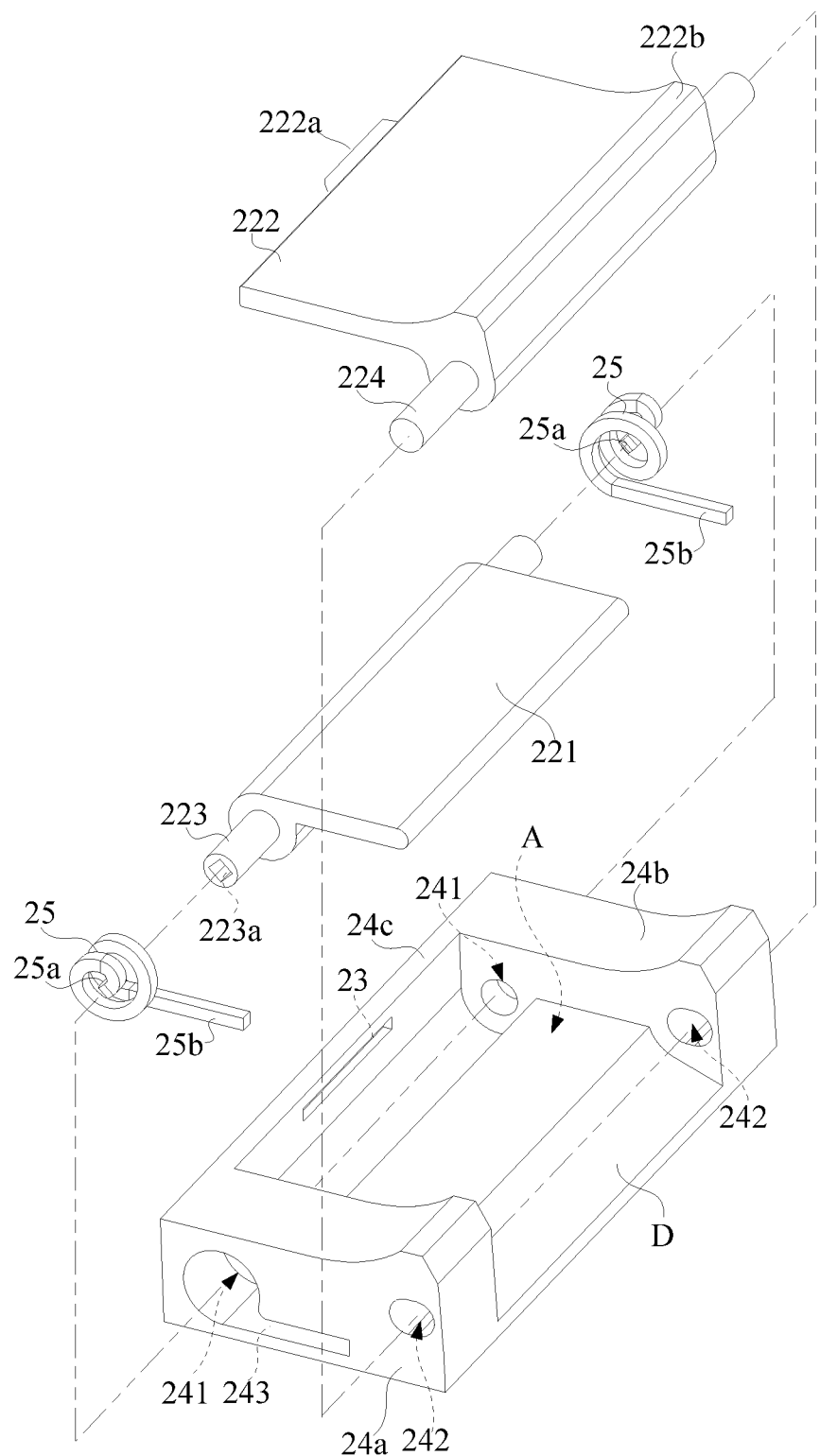
FIG. 5 is an exploded structural schematic view of a support and a support assembly of a mobile terminal according to an embodiment.
Figure 6:
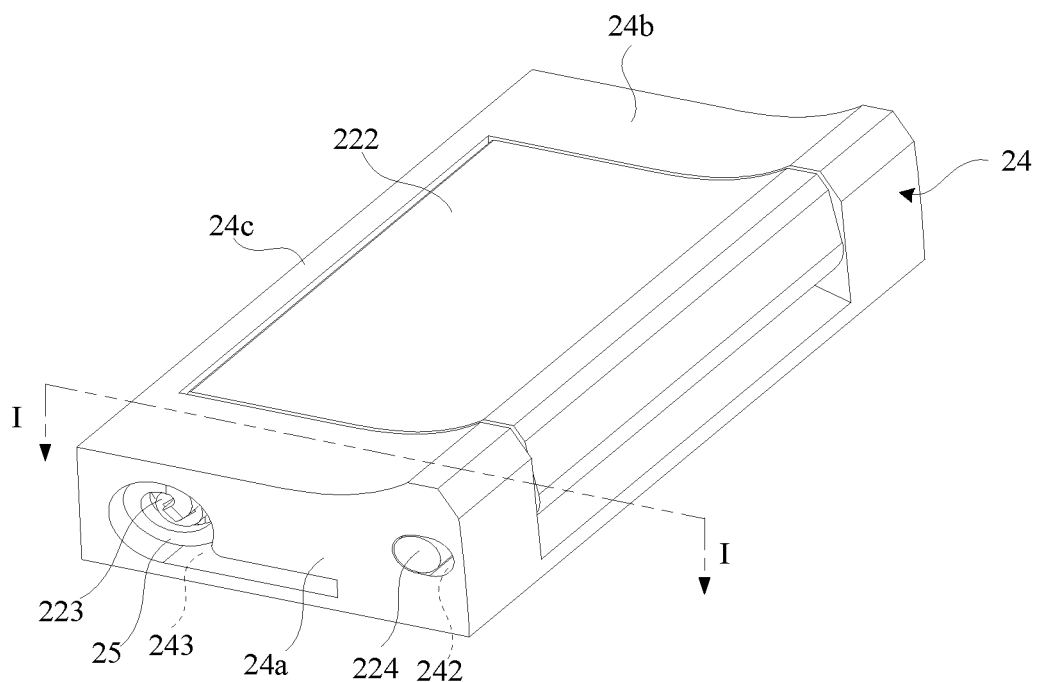
FIG. 6 is a schematic view of the support assembly and the support of the mobile terminal shown in FIG. 5, and the support assembly and the support in FIG. 6 are in an assembly state.

Combined with FIG. 5 and FIG. 6, in an embodiment, the body 21 includes a body portion (not labeled) and a support 24 disposed on the body portion. In some embodiments, the body portion may be integrated with the support 24 to form one-piece component. In some embodiments, the body portion and the support 24 may be two individual components and connected to each other by means of such as welding, adhesive, or the like. The support 24 includes a connecting wall 24c and a pair of side walls 24a and 24b. The pair of side walls 24a and 24b are opposite to each other and connected to two opposite ends of the connecting wall 24c to cooperatively define the accommodating groove A, and the side slot 23 is defined in the connecting wall 24c. The support assembly 22 is located between the pair of side walls 24a and 24b. Specifically, the first support piece 221 is rotatably connected to the pair of side walls 24a and 24b, and the second support piece 222 is also rotatably connected to the pair of side walls 24a and 24b. In this way, the support assembly 22 may be pre-assembled on the support 24, and then assembled on the body portion, thereby effectively reducing structural complexity of the body 21, facilitating processing, and improving production efficiency of the host device 20. In other embodiments, the support 24 may be integrated with a shell of the body portion, which may also meet need of moving the support assembly 22 to the folded state and the unfolded state, and will not be described here.

Figure 8:
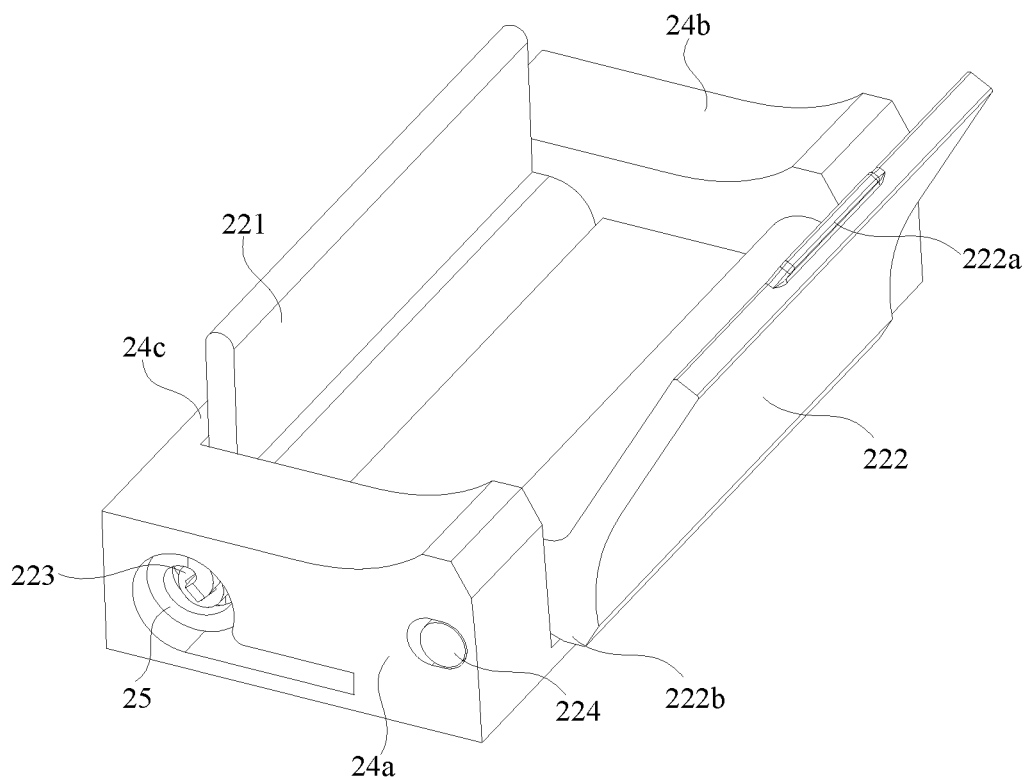
FIG. 8 is an isometric structural schematic view of the support and the support assembly of the mobile terminal shown in FIG. 6, and the support and the support assembly in FIG. 8 are in an unfolded state.

As shown in FIG. 5, in an embodiment, the elastic member may be a torsion spring 25. In some embodiments, one torsion spring 25 may be arranged to drive the first support piece 221 to rotate relative to the body 21. However, in other embodiments, two or more torsion springs 25 may also be arranged to provide larger torsion moment. For example, as shown in FIG. 5, torsion springs 25 are respectively connected on both sides of the first support piece 221. Specifically, one end 25a of each torsion spring 25 is connected to the first support piece 221, and the other end 25b of each torsion spring 25 is connected to the support 24. As shown in FIG. 8, when the second support piece 222 is able to rotate relative to the body 21 without limiting rotational degree of freedoms, that is, after the boss 222a is detached from the side slot 23, torsion moment provided by the torsion spring 25 may drive the first support piece 221 to rotate relative to the support 24 to rotate out of the accommodating groove A, and at the same time, the second support piece 222 may be rotated out of the accommodating groove A.

As shown in FIG. 5, the first support piece 221 includes a first rotating shaft 223. Each of the pair of side walls 24a and 24b defines a first shaft hole 241, respectively. The first rotating shaft 223 may be rotatably inserted in the first shaft hole 241 to realize a rotational connection between the first support piece 221 and the support 24. Each of the pair of side walls 24a and 24b defines a holding slot 243 fluidly connected to the first shaft hole 241, respectively. Each torsion spring 25 is held or received in the holding slot 243. One end 25a of each torsion spring 25 is connected to the first rotating shaft 223. The holding slot 243 may provide assembly space for the torsion spring 25. In this way, it is possible to reduce the risk of interference caused by the torsion spring 25 occupying space of the accommodating groove A when the first support piece 221 is accommodated within the accommodating groove A. In an embodiment, the first rotating shaft 223 defines a socket 223a on an end of the first rotating shaft 223. One end 25a of the torsion spring 25 is inserted in the socket 223a, and the other end 25b of the torsion spring 25 is held in the holding slot 243 and abuts against the groove wall of the holding slot 243. Thus, the first support piece 221 may rotate relative to the body 21 under action of the torsion spring 25 until the first support piece 221 contacts and is limited to the connecting wall 24c and further remains in the unfolded state (as shown in FIG. 8).

Figure 7:
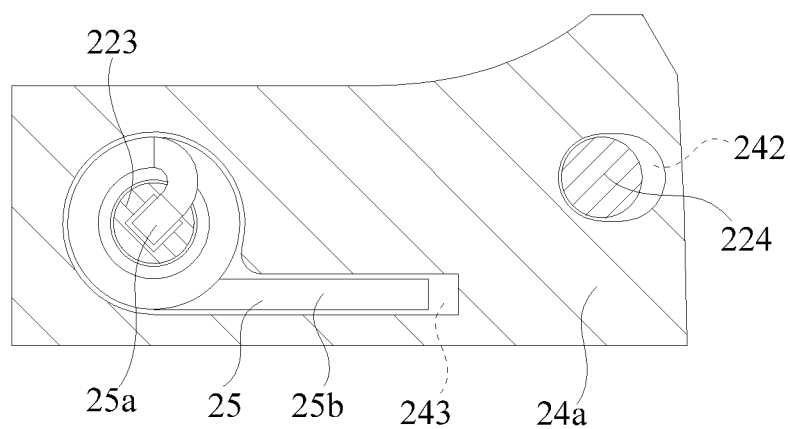
FIG. 7 is a cross-sectional view of the support and the support assembly of the mobile terminal taken along line I-I in FIG. 6.

As further shown in FIG. 5, the second support piece 222 includes a second rotating shaft 224. Each of the pair of side walls 24a and 24b defines a second shaft hole 242, respectively. The second rotating shaft 224 may be rotatably inserted in the second shaft hole 242. Thus, the second support piece 222 may rotate relative to the support 24. When the support assembly 22 is in the folded state, that is, the second support piece 222 is accommodated within the accommodating groove A, in this case, the boss 222a may cooperate with the side slot 23 to restrict the second support piece 222 from rotating out of the accommodating groove A (as shown in FIG. 6). When it is necessary to remove or release restriction to the rotational degrees of freedom of the second support piece 222, it is necessary to remove the boss 222a from the side slot 23. For example, in an embodiment, combining with FIG. 7 and FIG. 8, a cross section of the second shaft hole 242 may be substantially oval or racetrack shaped, and the second rotating shaft 224 inserted in the second shaft hole 242 may move in the second shaft hole 242, so that the boss 222a may be inserted into or moved out of the side slot 23. In some embodiments, the second shaft hole 242 may include a long axis and a short axis, and the second shaft hole 242 may be movable along the long axis. When the second rotating shaft 224 moves in the second shaft hole 242 in a direction close to or adjacent to the side slot 23 along the long axis, the second support piece 222 may be driven to move in the accommodating groove A along the direction close to or adjacent to the side slot 23, and the boss 222a may be further driven to be inserted into the side slot 23 along with the movement of the second support piece 222. When the second rotating shaft 224 moves in the second shaft hole 242 in a direction away from the side slot 23 along the long axis, the second support piece 222 may be driven to move in the accommodating groove A along the direction away from the side slot 23, and the boss 222a may be further driven to be moved out of the side slot 23, in this case, the second support piece 222 may be rotatable relative to the support 24. Of course, in some other embodiments, the second shaft hole 242 may be movable along the short axis. When the boss 222a moves out of the side slot 23, the second support piece 222 may rotate relative to the support 24 to rotate out of the accommodating groove A. Thus, the first support piece 221 may be rotated out under the action of the torsion spring 25 and the second support piece 222 may be driven to rotate, so that the support assembly 22 is in the unfolded state.

As shown in FIG. 3 and FIG. 6, when the support assembly 22 is in the folded state, a surface of the second support piece 222 away from the rear end face 202 is substantially flush with the front end face 201. In this way, it is possible to not only improve the overall aesthetic feeling of the host device 20, but also reduce the risk of interference caused by the support assembly 22 when the display device 10 is stacked on the host device 20.

As further shown in FIG. 1, in an embodiment, the side peripheral surface 13 includes a top surface 13a, a bottom surface 13b, a left surface 13c, and a right surface 13d. The bottom surface 13b and the top surface 13a are arranged opposite to each other. The left surface 13c and the right surface 13d are arranged opposite to each other. The top surface 13a is located between the left surface 13c and the right surface 13d. The bottom surface 13b is located between the left surface 13c and the right surface 13d.

As shown in FIG. 10, in an embodiment, a first magnetic component 26 is disposed on the body 21, and a second magnetic component 14 is disposed on the display device 10. When the display device 10 is stacked on the front end face 201 from a side at which the back surface 12a is located or a side at which the front surface 11a is located, the first magnetic component 26 may absorb the second magnetic component 14 to connect the display device 10 to the body 21. Understandably, when it is necessary to stack or place the display device 10 on the body 21, the support assembly 22 may be rotated to be in the folded state. Because the support assembly 22 may be accommodated within the accommodating groove A in the folded state, the display device 10 may be tightly stacked on the body 21 without interference of the support assembly 22. Besides, the first magnetic component 26 may be aligned with the second magnetic component 14 conveniently, which may ensure magnetic attraction effect of the first magnetic component 26 and the second magnetic component 14.

In an embodiment, the body 21 is provided with a plurality of first magnetic components 26, and the display device 10 is provided with a plurality of second magnetic components 14. The number of the plurality of first magnetic components 26 is the same as the number of the second magnetic components 14. For example, in some embodiments, the number of the plurality of first magnetic components 26 may be marked with "N", and the number of the plurality of second magnetic components 14 may be marked with "N". N is an integer greater than or equal to 2. When the display device 10 is stacked on the body 21, the first magnetic components 26 and the second magnetic components 14 are in one-to-one correspondence and may be magnetically matched with each other to obtain a larger magnetic attraction and improve stability of magnetic attraction effect between the display device 10 and the body 21.

In an embodiment, one of the first magnetic component 26 and the second magnetic component 14 includes a magnet, and the other includes a magnetic metal component. It is understandable that the magnetic metal component is a component made of a metal material that may be magnetically attracted, such as a magnetic iron block or a magnetic steel.

Figure 11:
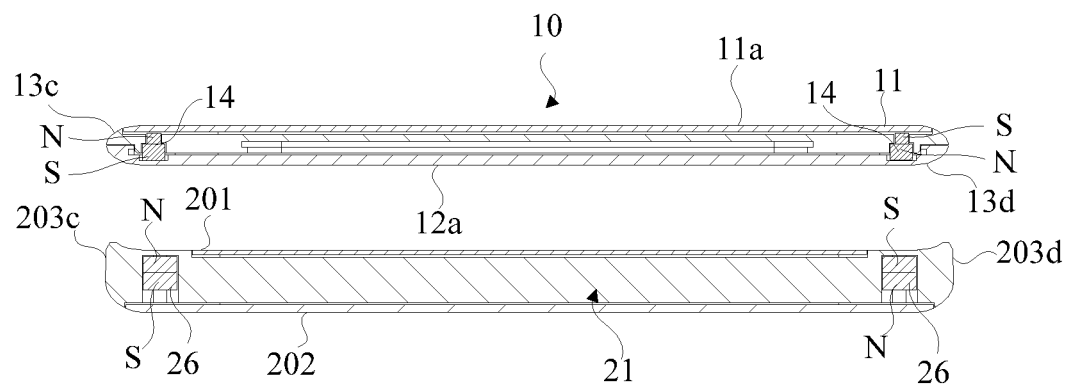
FIG. 11 is a schematic view of a display device and a host device of a mobile terminal, when magnetic attraction occurs between a front surface of the display device away from the host device and the host device according to an embodiment.
Figure 12:
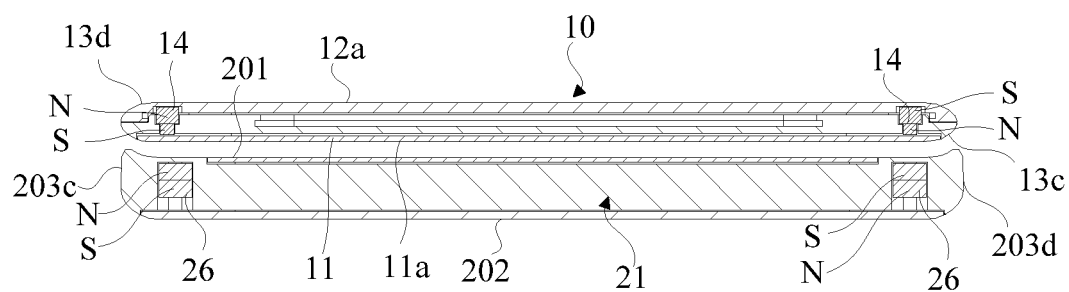
FIG. 12 is a schematic view of a display device and a host device of a mobile terminal, when magnetic attraction occurs between a front surface of a display device facing a host device and the host device according to an embodiment.

In other embodiments, the first magnetic component 26 and the second magnetic component 14 are both magnets. For example, as shown in FIG. 11 and FIG. 12, no matter whether a side of the display device 10 away from the front surface 11a or a side of the display device 10 facing the front surface 11a is placed on the front end face 201 of the body, the display device 10 and the body 21 may be fixed by magnetic attraction between the magnets. It may be seen that when magnets of the display device 10 turn to face the body 21 with different surfaces of the display device 10, although magnetic orientations of the magnets on the display device 10 changes, corresponding magnets which may match with the magnetic attraction of the magnets on the display device 10 always exist on the body 21. As shown in FIG. 11, N-pole of the magnet located near or adjacent to the left end face 203c of the body 21 is oriented toward the display device 10, and S-pole of the magnet located near the right end face 203d of the body 21 is oriented toward the display device 10. Thus, when the side of the display device 10 away from the front surface 11a is placed on the front end face 201, the S-pole of the magnet located near the left surface 13c is oriented toward the body 21, and the N-pole of the magnet located near the right surface 13d is oriented toward the body 21. In this way, the display device 10 and the body 21 may be magnetically fixed together. As shown in FIG. 12, when the front surface 11a of the display device 10 is facing the body 21, the S-pole of the magnet near the right surface 13d is oriented towards the body 21, and is opposite to the magnet near the left end face 203c of the body 21 to realize magnetic attraction fixation. Correspondingly, with turnover of the display device 10, the magnet near the left surface 13c will be opposite to or face towards the magnet near the right end face 203d of the body 21. At the same time, the N-pole of the magnet near the left surface 13c faces the body 21. Because the S-pole of the magnet near the right end face 203d of the body 21 faces the display device 10, the display device 10 and the body 21 may be magnetically fixed together.

Figure 13:
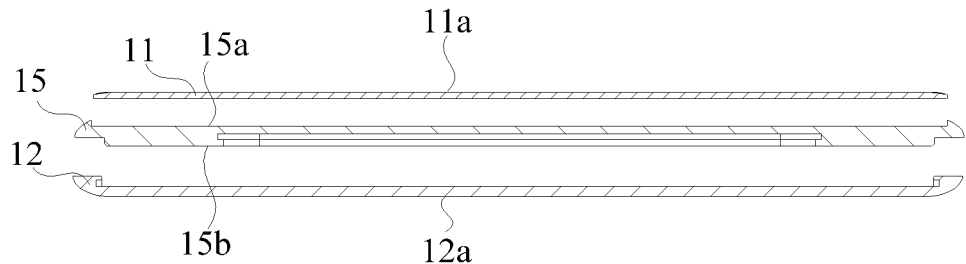
FIG. 13 is a structural schematic view of a display device of a mobile terminal according to an embodiment.

In other embodiments, a metal material capable of realizing magnetic attraction may also be selected as a shell material of the display device 10. Thus, the first magnetic component 26 of the body 21 may attract the side peripheral surface 13 of the fixed display device 10. For example, as shown in FIG. 13, the display device 10 includes a rear shell 12 and a metal frame 15. The display screen 11 is connected to the rear shell 12 through the metal frame 15, so that the display device 10 may be stably stacked on the front end face 201 of the body 21 by using magnetic force between the first magnetic component 26 and the metal frame 15.

In the embodiment of the display device 10 including the metal frame 15, since the metal frame 15 of the display device 10 may be magnetically attracted, there is no need to arrange the second magnetic component 14 separately. Thus, reserved space for arranging the second magnetic component 14 may be reduced and the display device 10 may be made thinner for carrying.

Furthermore, the rear shell 12 may also be made of magnetic metal material. Thus, the first magnetic component 26 may also produce magnetic attraction effect on the rear shell 12 and enhance the attraction force. Understandably, the rear shell 12 of the metal material may be integrally formed with the metal frame 15, thereby improving structural strength.

In one embodiment, the display screen 11 may be a liquid crystal display (LCD) screen for displaying information, and the LCD screen may be a TFT (thin film transistor) screen, an IPS (in plane switching) screen or a SLCD (splice liquid crystal display) screen. In another embodiment, the display screen 11 may be an OLED (organic light emitting diode) screen for displaying information, and the OLED screen may be an AMOLED (active matrix organic light emitting diode) screen, a super AMOLED (super active matrix organic light emitting diode) screen, or a super AMOLED plus screen, which will not be described here.

Figure 14:
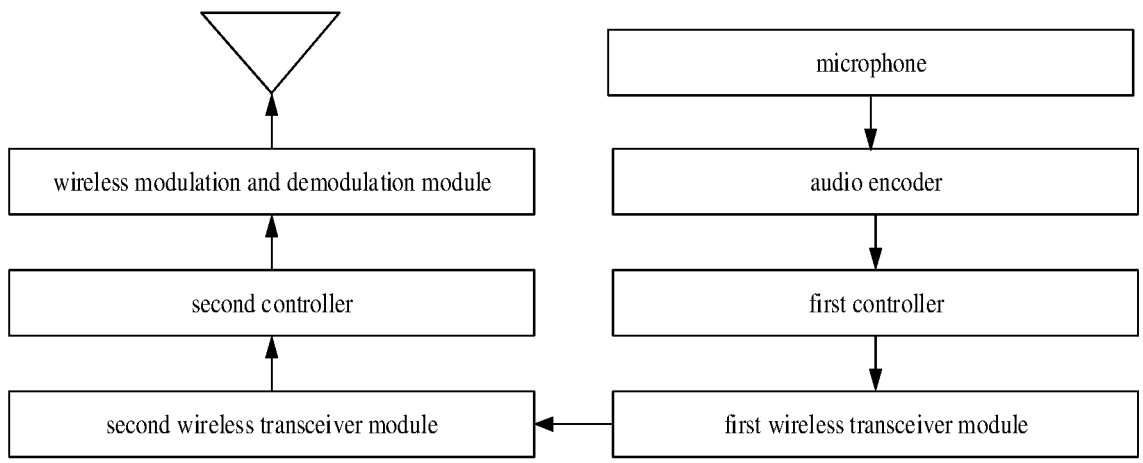
FIG. 14 is a workflow chart of a mobile terminal according to an embodiment.
Figure 15:
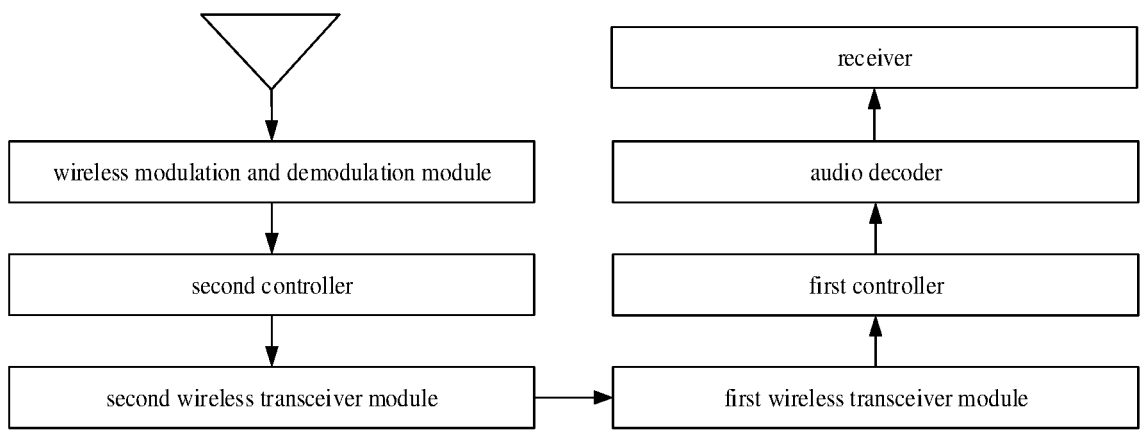
FIG. 15 is another workflow chart of the mobile terminal shown in FIG. 14.

As shown in FIG. 14 and FIG. 15, in an embodiment, a display device 10 includes a first controller, a microphone, a receiver, a first wireless transceiver module, an audio encoder, and an audio decoder. The audio encoder is configured to encode audio signals in process of transmission, which may facilitate transmission, storage, or encryption. The audio decoder is configured to decode the encoded audio signals. The host device 20 includes a wireless modulation and demodulation module, a second controller, and a second wireless transceiver module configured to communicate with the first wireless transceiver module. In a working state of the mobile terminal 100, audio signals from the microphone are encoded by the audio encoder and then transmitted to the first controller. Under control of the first controller, encoded audio signals are transmitted from the first wireless transceiver module to the second wireless transceiver module. Under control of the second controller, the encoded audio signals are transmitted to the wireless modulation and demodulation module, and sent to air after being modulated by the wireless modulation and demodulation module to the air to complete encoding and transmitting of the audio signals. The encoded audio signals from the air are demodulated by the wireless modulation and demodulation module and then transmitted to the second controller. Under the control of the second controller, the encoded audio signals are transmitted to the second wireless transceiver module, and sent to the display device 10 after being modulated by the second wireless transceiver module. The first wireless transceiver module demodulates the encoded audio signals. Under the control of the first controller, the encoded audio signals are decoded by the audio decoder and output by the receiver to complete receiving and decoding of the audio signals. It may be understood that the audio encoder may be a separate hardware unit, may be integrated in the microphone, may be integrated in the first controller, or may also be an audio codec with audio decoding function in terms of function of the audio encoder. The audio decoder may be a separate hardware unit, may also be integrated in the receiver, may be integrated in the first controller, or may also be an audio codec with audio coding function in terms of function of the audio decoder.

Figure 16:
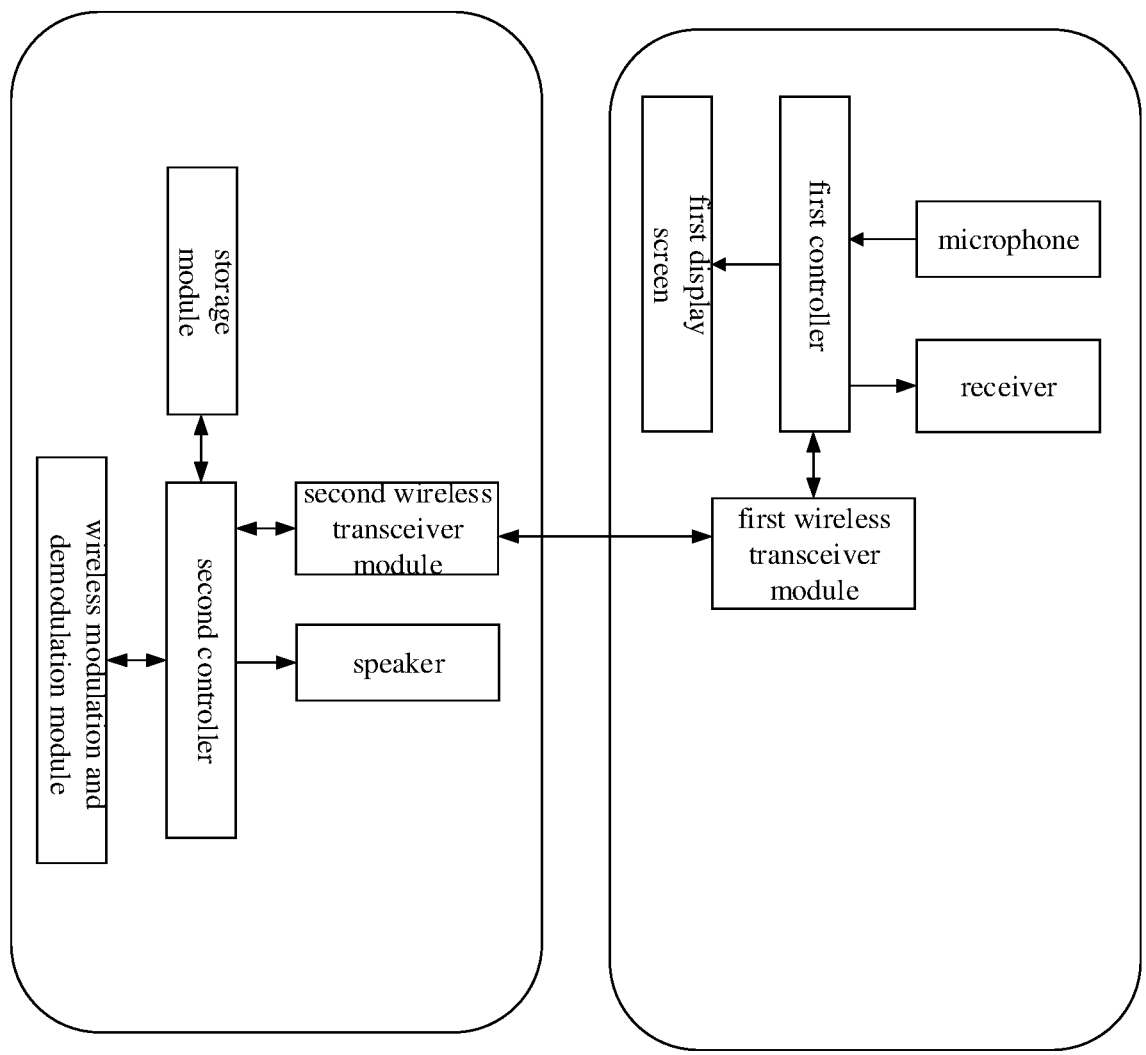
FIG. 16 is a block diagram of a mobile terminal according to an embodiment.
Figure 17:
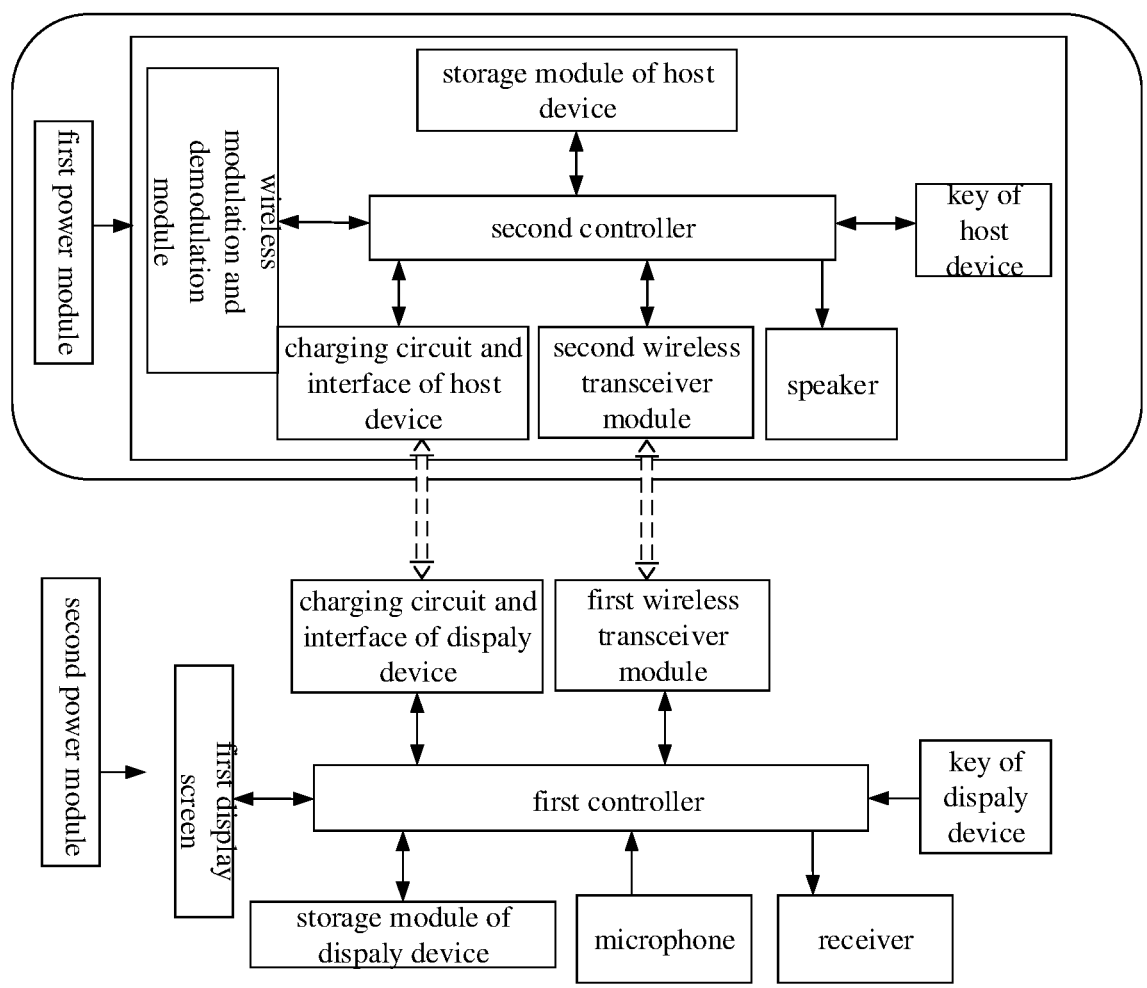
FIG. 17 is a block diagram of a mobile terminal according to another embodiment.

As shown in FIG. 16 and FIG. 17, in an embodiment, a display device 10 includes a first controller and a first wireless transceiver module. The first controller may be capable of communicating with the first wireless transceiver module. The host device 20 includes a wireless modulation and demodulation module, a second controller, and a second wireless transceiver module configured to communicate with the first wireless transceiver module. The second controller may be capable of communicating with the wireless modulation and demodulation module and the second wireless transceiver module. The display device 10 may be capable of access a communication network through the host device 20.

Figure 18:
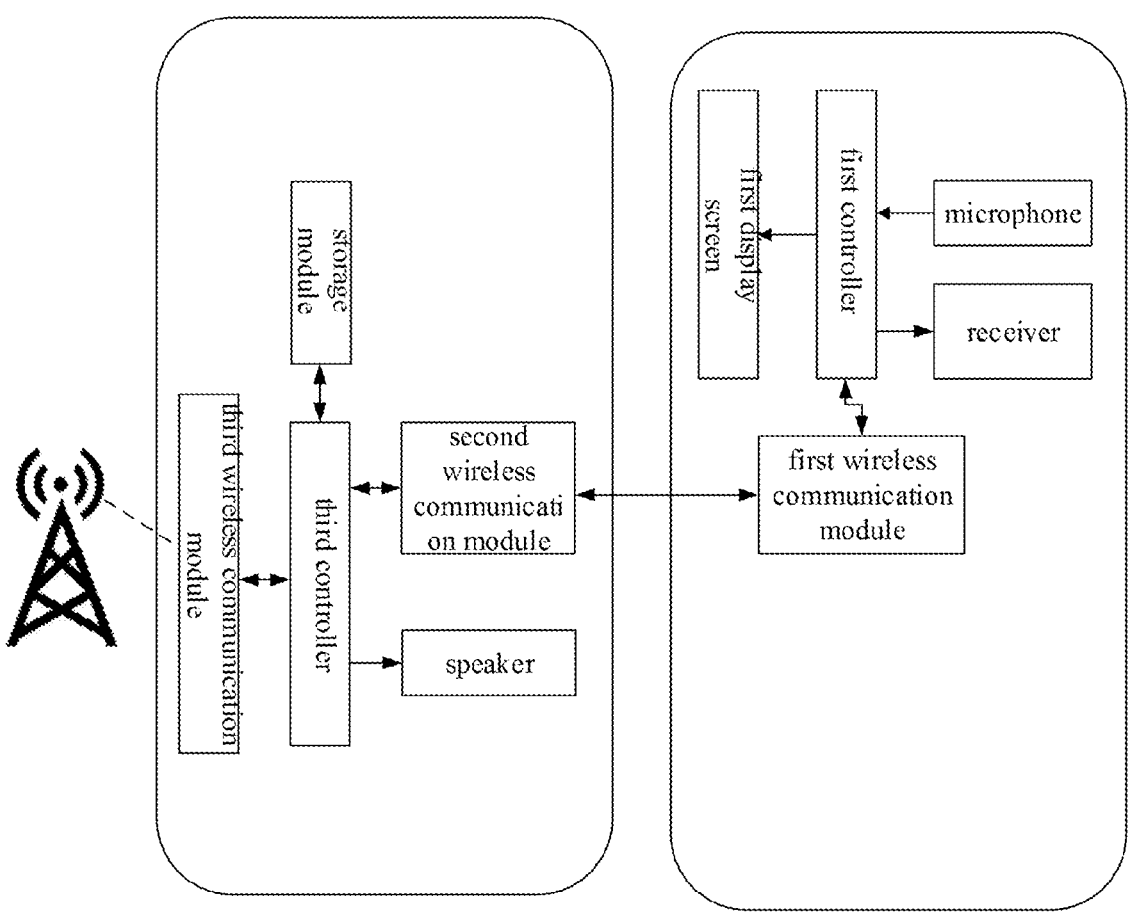
FIG. 18 is a block diagram of a mobile terminal according to another embodiment.

As shown in FIG. 18, in an embodiment, a display device 10 includes a first controller and a first wireless communication module. The first controller may be capable of communicating with the first wireless communication module. The host device 20 includes a second controller, a second wireless communication module and a third wireless communication module. The second controller may be capable of communicating with the second wireless communication module and the third wireless communication module, the second wireless communication module may be capable of communicating with the first wireless communication module, and the third wireless communication module may be capable of communicating with a base station. In one embodiment, the second wireless communication module and the first wireless communication module are both low power Bluetooth communication modules. In other embodiments, the second wireless communication module and the first wireless communication module may both be wireless local area network (WiFi) communication modules.

The technical features of the above-mentioned embodiments may be combined in any way. In order to simplify the description, not all possible combinations of the technical features of the above-mentioned embodiments have been described. However, as long as there is no contradiction in the combination of these technical features, the combination of these technical features should be considered as the scope recorded in this specification.

The above-mentioned examples only express several embodiments of the present disclosure, and their descriptions are more specific and detailed, but they should not be construed as limiting the scope of disclosure patents. It should be pointed out that, for those of ordinary skill in the art, several modifications and improvements may be made without departing from the concept of the present disclosure, which are all within the scope of protection of the present disclosure. Therefore, the scope of protection of the present disclosure patent shall be subject to the appended claims.

What is claimed is:

1. A host device, configured to support a display device, the display device comprising a front surface, a back surface, and a side peripheral surface, the back surface being arranged opposite to the front surface, and the side peripheral surface being connected between the front surface and the back surface, the display device comprising a display screen, and a display region of the display screen facing one side of the display device at which the front surface is located;

the host device comprising:
    a body, wherein the display device is capable of being mounted on the body, the display device is detachable from the body, the body is configured to communicate with the display device; and
    a support assembly, comprising a first support piece and a second support piece, wherein the first support piece is rotatable around a first rotation axis relative to the body, the second support piece is rotatable around a second rotation axis relative to the body, and the support assembly has a folded state and an unfolded state; when the support assembly is in the folded state, the first support piece and the second support piece are both accommodated within an accommodating groove; when the support assembly is in the unfolded state, the first support piece and the second support piece are rotated out of the accommodating groove and vertically or slantwise stand on the body, and the first support piece and the second support piece define a clamping groove; when the display device is clamped in the clamping groove, the first support piece contacts the front surface, the second support piece contacts the back surface, and the display device stands vertically or slantwise on the body;
    wherein the accommodating groove comprises a bottom wall and an abutting surface recessed from the bottom wall, the second support piece comprises a support piece body and an eccentric block connected to the support piece body, the second rotation axis runs through the eccentric block, the eccentric block is provided with an abutting bump, and the abutting bump is disposed at one side of the eccentric block away from the first support piece when the support assembly is in the folded state;
    wherein when the support assembly is in the unfolded state, the abutting bump contacts with the abutting surface, and the second support piece stands vertically or slantwise on the body.

2. The host device as claimed in claim 1, wherein the host device comprises a front end face, a rear end face, and a side end face, the front end face is arranged opposite to the rear end face, the side end face is connected between the front end face and the rear end face, and the accommodating groove runs through the front end face and the side end face.

3. The host device as claimed in claim 1, wherein the body defines a side slot fluidly connected to the accommodating groove, and the second support piece is provided with a boss, when the support assembly is in the folded state, the second support piece is stacked on the first support piece, and the boss is configured to cooperate with the side slot and restrict rotation of the second support piece relative to the body; and an elastic member is arranged between the first support piece and the body, after the boss is detached from the side slot, the elastic member is configured to drive the first support piece to rotate around the first rotation axis relative to the body, and the first support piece is capable of rotating the second support piece out of the accommodating groove.

4. The host device as claimed in claim 3, wherein the body comprises a support, the support comprises a connecting wall and a pair of side walls, the pair of side walls are arranged opposite to each other and connected to two opposite ends of the connecting wall to cooperatively define the accommodating groove, the first support piece is rotatably connected to the pair of side walls, and the second support piece is rotatably connected to the pair of side walls.

5. The host device as claimed in claim 4, wherein the elastic member comprises a torsion spring, one end of the torsion spring is connected to the first support piece, and the other end of the torsion spring is connected to the support.

6. The host device as claimed in claim 5, wherein the first support piece comprises a first shaft, each of the pair of side walls defines a first shaft hole and a holding slot fluidly connected to the first shaft hole, the first shaft is rotatably inserted in the first shaft hole, the torsion spring is held in the holding slot, and one end of the torsion spring is connected to the first shaft hole.

7. The host device as claimed in claim 4, wherein the second support piece comprises a second rotating shaft, each of the pair of side walls defines a second shaft hole, the second rotating shaft is rotatably inserted in the second shaft hole, and a cross section of the second shaft hole is substantially oval or racetrack shaped; and the second rotating shaft is movable in the second shaft hole, and the boss is inserted into the side slot or moved out of the side slot along with the movement of the second rotating shaft in the second shaft hole.

8. The host device as claimed in claim 2, wherein a surface of the second support piece away from the rear end face is substantially flush with the front end face when the support assembly is in the folded state.

9. The host device as claimed in claim 1, wherein a first magnetic component is disposed on the body, and a second magnetic component is disposed on the display device, when the display device is stacked on a front end from a side at which the back surface is located or a side at which the front surface is located, the first magnetic component is configured to absorb the second magnetic component to connect the display device to the body.

10. A mobile terminal, comprising:
a display device, comprising:
a front surface;
a back surface, arranged opposite to the front surface;
a side peripheral surface, connected between the front surface and the back surface; and a display screen, having a display region facing one side of the display device at which the front surface is located; and a host device, comprising:
a body, wherein the display device is capable of being mounted on the body, the display device is detachable from the body, the display device is configured to communicate with the body, and the body defines an accommodating groove; and a support assembly, comprising a first support piece and a second support piece, wherein the first support piece is rotatable around a first rotation axis relative to the body, the second support piece is rotatable around a second rotation axis relative to the body, and the support assembly has a folded state and an unfolded state; when the support assembly is in the folded state, the first support piece and the second support piece are both accommodated within the accommodating groove, when the support assembly is in the unfolded state, the first support piece and the second support piece are rotated out of the accommodating groove and vertically or slantwise stand on the body, and the first support piece and the second support piece define a clamping groove; when the display device is clamped in the clamping groove, the first support piece contacts the front surface, the second support piece contacts the back surface, and the display device stands vertically or slantwise on the body;

wherein the accommodating groove comprises a bottom wall and an abutting surface recessed from the bottom wall, and the second support piece comprises a support piece body and an eccentric block connected to the support piece body, the second rotation axis runs through the eccentric block, the eccentric block is provided with an abutting bump, and the abutting bump is disposed at one side of the eccentric block away from the first support piece when the support assembly is in the folded state;

wherein when the support assembly is in the unfolded state, the abutting bump contacts with the abutting surface, and the second support piece stands vertically or slantwise on the body.

11. The mobile terminal as claimed in claim 10, wherein the host device comprises a front end face, a rear end face, and a side end face, the front end face is arranged opposite to the rear end face, the side end face is connected between the front end face and the rear end face, and the accommodating groove runs through the front end face and the side end face.

12. The mobile terminal as claimed in claim 10, wherein the body defines a side slot fluidly connected to the accommodating groove, and the second support piece is provided with a boss, when the support assembly is in the folded state, the second support piece is stacked on the first support piece, and the boss is configured to cooperate with the side slot and restrict rotation of the second support piece relative to the body; and an elastic member is arranged between the first support piece and the body, after the boss is detached from the side slot, the elastic member is configured to drive the first support piece to rotate around the first rotation axis relative to the body, and the first support piece is capable of rotating the second support piece out of the accommodating groove.

13. The mobile terminal as claimed in claim 12, wherein the body comprises a support, the support comprises a connecting wall and a pair of side walls, the pair of side walls are arranged opposite to each other and connected to two opposite ends of the connecting wall to cooperatively define the accommodating groove, the first support piece is rotatably connected to the pair of side walls, and the second support piece is rotatably connected to the pair of side walls.

14. The mobile terminal as claimed in claim 13, wherein the second support piece comprises a second rotating shaft, each of the pair of side walls defines a second shaft hole, the second rotating shaft is rotatably inserted in the second shaft hole, and a cross section of the second shaft hole is substantially oval or racetrack shaped; and the second rotating shaft is movable in the second shaft hole, and the boss is inserted into the side slot or moved out of the side slot along with the movement of the second rotating shaft in the second shaft hole.

15. A mobile terminal, comprising:
a display device, comprising:
a display surface; and
a non-display surface, arranged opposite to the display surface; and
a host device, comprising:
a body, wherein the display device is capable of being mounted on the body, the display device is detachable from the body, the display device is configured to communicate with the body, and the body defines an accommodating groove; and
a support assembly, comprising a first support piece and a second support piece, wherein the first support piece and the second support piece are both rotatably connected to the body, and the support assembly has a folded state and an unfolded state; wherein when the support assembly is in the folded state, the first support piece and the second support piece are both accommodated within the accommodating groove; when the support assembly is in the unfolded state, the first support piece and the second support piece are rotated out of the accommodating groove and vertically or slantwise stand on the body, and the first support piece and the second support piece define a clamping groove; when the display device is clamped in the clamping groove, the first support piece contacts the display surface, the second support piece contacts the non-display surface, and the display device stands vertically or slantwise on the body; wherein the accommodating groove comprises and bottom wall and an abutting surface recessed from the bottom wall, and the second support piece comprises a support piece body and an eccentric block connected to the support piece body, the second rotation axis runs through the eccentric block, the eccentric block is provided with an abutting bump, and the abutting bump is disposed at one side of the eccentric block away from the first support piece when the support assembly is in the folded state; wherein when the support assembly is in the unfolded state, the abutting bump contacts with the abutting surface, and the second support piece stands vertically or slantwise on the body.

16. The mobile terminal as claimed in claim 15, wherein a bottom wall of the accommodating groove comprises an abutting surface, and the second support piece comprises a support piece body and an eccentric block connected to the support piece body, the second rotation axis runs through the eccentric block, the eccentric block is provided with an abutting bump, and the abutting bump is disposed at one side of the eccentric block away from the first support piece when the support assembly is in the folded state;
wherein when the support assembly is in the unfolded state, the abutting bump contacts with the abutting surface, and the second support piece stands vertically or slantwise on the body.

17. The mobile terminal as claimed in claim 15, wherein the body defines a side slot fluidly connected to the accommodating groove, and the second support piece is provided with a boss, when the support assembly is in the folded state, the second support piece is stacked on the first support piece, and the boss is configured to cooperate with the side slot and restrict rotation of the second support piece relative to the body; and an elastic member is arranged between the first support piece and the body, after the boss is detached from the side slot, the elastic member is configured to drive the first support piece to drive the second support piece to rotate out of the accommodating groove together to make the support assembly in the unfolded state.

18. The mobile terminal as claimed in claim 15, wherein the display device comprises a first controller, a microphone, a receiver, a first wireless transceiver module, an audio encoder, and an audio decoder; the host device comprises a wireless modulation and demodulation module, a second controller, and a second wireless transceiver module configured to communicate with the first wireless transceiver module; the body comprises a first wireless communication module, the display device comprises a second wireless communication module communicating with the first wireless communication module; and in a working state of the mobile terminal, audio signals from the microphone are encoded by the audio encoder and then transmitted to the first controller; under control of the first controller, encoded audio signals are transmitted from the first wireless transceiver module to the second wireless transceiver module; under control of the second controller, the encoded audio signals are transmitted to the wireless modulation and demodulation module, and sent to air after being modulated by the wireless modulation and demodulation module; the encoded audio signals from the air are demodulated by the wireless modulation and demodulation module and then transmitted to the second controller; under the control of the second controller, the encoded audio signals are transmitted to the second wireless transceiver module, and sent to the display device after being modulated by the second wireless transceiver module, and the first wireless transceiver module demodulates the encoded audio signals; under the control of the first controller, the encoded audio signals are decoded by the audio decoder and output by the receiver.

19. The mobile terminal of claim 15, wherein the body comprises a support, the support comprises a connecting wall and a pair of side walls, the pair of side walls are arranged opposite to each other and connected to two opposite ends of the connecting wall to cooperatively define the accommodating groove, the first support piece is rotatably connected to the pair of side walls, and the second support piece is rotatably connected to the pair of side walls.

* * * * *